United States Patent [19]

Sugano et al.

[11] 3,931,007
[45] Jan. 6, 1976

[54] METHOD OF EXTRACTING HEAVY METALS FROM INDUSTRIAL WASTE WATERS

[75] Inventors: Izuru Sugano; Toshiro Tsuji; Masaru Kanamori, all of Tokyo, Japan

[73] Assignee: Nippon Electric Company Limited, Tokyo, Japan

[22] Filed: Dec. 17, 1973

[21] Appl. No.: 425,123

[30] Foreign Application Priority Data
Dec. 19, 1972  Japan.............................. 47-127816
Dec. 20, 1972  Japan.............................. 47-128666
Apr. 10, 1973  Japan.............................. 48-41172

[52] U.S. Cl. ...................... 210/50; 75/109; 210/52
[51] Int. Cl.² ........................................... C02B 1/20
[58] Field of Search ..................... 210/42, 50–53, 210/47, 49; 423/140, 142, 594; 75/108, 109

[56] References Cited
UNITED STATES PATENTS 2,232,295  2/1941  Urbain et al. ......................... 210/42
3,347,787  10/1967  Rhodes ................................. 210/50
3,575,854  4/1971  Richards............................... 210/50
3,617,559  11/1971  Cywin................................... 210/50

FOREIGN PATENTS OR APPLICATIONS
1,142,214  2/1969  United Kingdom

*Primary Examiner*—Charles N. Hart
*Assistant Examiner*—Peter A. Hruskoci
*Attorney, Agent, or Firm*—Hopgood, Calimafde, Kalil, Blaustein and Lieberman

[57] ABSTRACT

A method is provided for extracting metal impurities from waste water to which ferrous ions are added to provide at least two times the amount of ferrous ions on the mol basis to the amount of metal ions present, the resulting solution containing acid radicals, a base being added to the solution to raise the pH to form a suspension of metal hydroxides, following which an oxidizing gas is bubbled in solution to form crystals containing ferric ions and further containing the metal ions originally in solution, the precipitated crystals being thereafter separated to provide clean water.

11 Claims, 3 Drawing Figures

METHOD OF EXTRACTING HEAVY METALS FROM INDUSTRIAL WASTE WATERS

This invention generally relates to the prevention of the environmental pollution and particularly to a method of extracting heavy metals, e.g. metal impurities, from industrial waste waters.

The surrounding environments, particularly the seas, lakes, rivers and the soil are being polluted by heavy metals contained in and thrown away with industrial waste waters. Waste waters of plating factories contain Cu, Ni, Cr, Sn, Cd or other metals. Those from glass industries, soda industries, and leather-tanning industries include Cd and Pb, Hg and Cr, respectively. Non-ferrous metal industries throw away waste waters containing a variety of heavy metals. It is widely known that Cd, Hg and Pb may be introduced into human bodies from polluted waters or soils through plants and animals and can fatally affect the human health. Also, other heavy metals might be injurious to the human body.

Among conventional methods of extracting heavy metals from waste water, widely known is a pH control method in which calcium hydroxide is added to waste water containing heavy metals to control the pH of the water. At the specific value of the pH, the heavy metal ions are changed to the hydroxide. Thus, precipitates of hydroxides of heavy metals are formed and separated from the water. This conventional method has, however, many defects. Since pH value to make precipitates differ with kinds of heavy metals, for example, 11 for Pb and higher than 11 for Cd, a single treatment is impossible to waste water containing a plurality of heavy metals. Since sizes of the precipitates are very small, e.g. of the order of 10 to 100 angstroms, separation of the precipitates from the water is difficult. Moreover, heavy metals are apt to be resolved from the precipitates when the pH of the environment is varied. For some heavy metals, such as Bi and V, any effective extracting method has not been known.

It is, therefore, the object of this invention to provide a novel method of extracting heavy metals from waste water in which precipitates containing heavy metals are easily separated from water and hardly resolve the heavy metals.

This invention is based on the following chemical reaction: aqueous solution containing ferrous ions forms the precipitates of hydroxides by adding alkaline materials and the precipitates change to ferromagnetic oxides such as $Fe_3O_4$ and/or oxyhydrates (or oxyhdroxides) FeOOH of a large size by bubbling an oxidizing gas such as air into the suspension of hydroxides. In this case, many kinds of heavy metals in the solution are substituted in the metal sites of $Fe_3O_4$ crystal lattice to form various kinds of ferrites or of FeOOH crystal lattice. Other kinds of heavy metals are firmly adsorbed by the ferrites thus formed, $Fe_3O_4$, and/or FeOOH. As a result, harmful heavy metals are almost completely extracted from the solution. According to this invention, the final precipitates of ferromagnetic oxides such as $Fe_3O_4$ and ferrites can be instantly removed from the solution by use of a magnet. Moreover, the precipitates of $Fe_3O_4$, ferrites and FeOOH have a larger size, e.g. at least about 0.05 microns, and hence, not only exhibit fast sedimentation but also are easily filtered. Anyway, the obtained precipitates containing heavy metals can be readily separated from the solution. Resolving of heavy metals from precipitates once formed scarcely occurs because they are enclosed in the lattice point of the precipitate crystals. It has been confirmed through waterwashing test that adsorption of other heavy metals by FeOOH, $Fe_3O_4$, or ferrites is so firm that it has not been observed in the same type of adsorption. The precipitates of ferrites can be used as raw materials of a low grade ferrite magnet. The precipitates of $Fe_3O_4$ and FeOOH containing heavy metals may be employed as raw materials of oxides of various kinds, a magnet, and colored pigments. According to this invention, all kinds of metals or heavy metals contained in one solution can be extracted by a single treatment. Moreover, such heavy metals that no method of treatment has been known can be extracted by this invention.

Now the invention will be described more in detail with reference to the drawings in which.

Figure 1:
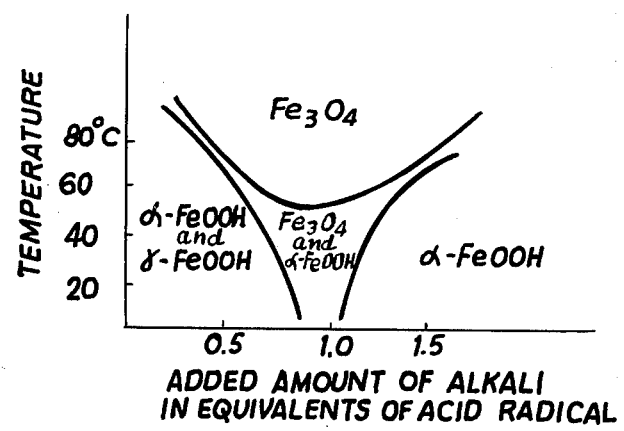
FIG. 1 is a graph illustrating the principle of the invention.

This invention is applied to waste waters containing at least one metal preferably having a specific gravity of 3.8 or more, such as the heavy metals Ti, V, Cr, Mn, Fe, Co, Ni, Cu, Zn, Y, Cd, Sn, Hg and Bi. The invention is applicable to other metal impurities, such as Al, Mg, etc. Amounts of heavy metals contained in waste water to be treated are first measured to know the total mol amount of the contained heavy metals other than ferrous ions. To this waste water, ferrous ions are added so that ferrous ions are present in the waste water in mol amounts of about two to hundred times the total number of mols of the contained heavy metals. As a source of ferrous ions, a ferrous salt such as ferrous sulphate or ferrous chloride can be used. Ferrous salts may be obtained abundantly and inexpensively from industrial wastes, that is, from pickling solutions of iron plates in the form of $FeSO_4 \cdot 7H_2O$, for instance, or as a by-product in the manufacture of titanium dioxide. Before or after the addition of ferrous ions, or at the same time of the addition of ferrous ions, an alkaline substance or base is added to the waste water. Examples of such substances are hydroxides or carbonates of alkali metals and alkaline earth metals. Alkaline substances or bases containing nitrogen such as $NH_4OH$, or an aqueous solution thereof may be employed. The amount of the base should range from about 0.9 to 1.2 equivalent, and more favorably from about 0.98 to 1.05 equivalent, of the acid radical contained in the waste water after the addition of ferrous ions. If the amount of addition of the base is in the mentioned range, that is, at or near 1 equivalent, all the heavy metals are easily extracted and magnetite or ferrites are easily formed by a subsequent oxidation process to be detailed below. However, if the amount is less than about 0.9 equivalent, heavy metals are apt to remain in the water, and, to prevent that, it needs too long time of oxidation. If the amount of addition of the alkaline substance or base exceeds 1.2 equivalent, a higher temperature is necessary in the oxidation process to form magnetite or ferrites. Moreover, some base remains in the treated waste water and makes it alkaline with the result that an additional process is required to neutralize the treated waste water before effluence.

As a result of addition of ferrous ions and alkali to the waste water, a suspension of ferrous hydroxide or a mixture of ferrous hydroxide and a hydroxide or hydroxides of some other heavy metal or metals are formed in the waste water. The suspension is then oxidized at a temperature between 10°C and 100°C while the hydroxides are stirred up.

For oxidation, an oxidizing gas such as air or oxygen should be bubbled into the waste water until the hydroxides disappear. By this process, ferrous ions which have been dissolved in the waste water in equilibrium with the hydroxides are mainly oxidized and crystal particles containing ferric ions are precipitated from the water. The hydroxides continuously dissolve into the waste water to supplement the ferrous ions, whereby oxidation progresses. The hydroxides dissolve into the waste water gradually and eventually vanish. Thus, particles of compounds containing ferric ions are obtained as a precipitate. The chemical composition, the crystal structure, and the particle size of the precipitate containing ferric ions are governed by various conditions such as the ratio of the amount of base to the acid radical, temperature during oxidation, time duration of oxidation, and concentration of ferrous ions.

Referring to FIG. 1, the precipitated particles containing ferric ions are of magnetite $Fe_3O_4$, ferric oxyhydrate FeOOH, or a mixture thereof, if the water contains only ferrous ions as metallic ions. Where a base of about 1 equivalent to the amount of the ferrous salt is added, a suspension of pH 9 to 10 is obtained. From this suspension, $Fe_3O_4$ is solely produced at an oxidizing temperature of about 50°C or more or a mixture of $Fe_3O_4$ and $\alpha$-FeOOH is produced at below about 50°C.

From the suspension formed as mentioned above in the waste water containing heavy metals, ferrites having a composition of $M_x Fe_{3-x}O_4$, where M represents a heavy metal or metals and $O > X \leqq 1$, are precipitated at a temperature of 60°C or more, preferably 60°C to 90°C. At a temperature of less than 60°C, a mixture of ferrite and FeOOH is precipitated. Where the heavy metals are Mn, Cd, and Zn, they are easily incorporated into magnetite to form ferrites in an amount of 1 mol or less ($X \leqq 1$) with respect to ferric ions of 2 mols. Some other heavy metals such as Pb, Cr, Hg, and Ni are incorporated into magnetite in a small amount of 0.1 mol or less with respect to 2 mols of ferric ions. For these heavy metals, therefore, plenty of ferrous ions, such as an amount of 20 times or more mols thereof are necessary. Other heavy metals are incorporated into magnetite in an intermediate amount between the foregoing two amounts. Two heavy metals may be incorporated into FeOOH in a very small amount. The remaining amounts of the heavy metals are considered to be adsorbed by magnetite, ferrite, or FeOOH. Since they cannot be taken off from magnetite, ferrite or FeOOH even by the ultrasonic rinsing in water, it is considered that they are connected with magnetite, ferrite, or FeOOH not by a simple adhesion but by a relatively strong bond of a certain type.

The precipitated ferrites, magnetite, or FeOOH have a larger particle size than 100 Angstroms. For example, ferrites and magnetite of 0.05 micron or more in particle size are obtained by oxidation at 50°C for 1 hour. If the time and the temperature of the oxidation are longer and higher, respectively, the precipitated crystals have a larger particle size. Although oxidation of a relatively long time is desirable to precipitate completely the heavy metals, a time duration of 30 hours is sufficient for oxidation from an economical viewpoint.

Since the precipitates have a larger particle size, they can be easily separated from the water by way of the usual sedimentation and filtering techniques. More conveniently, ferrites and magnetite among the precipitates can be removed by a magnet. It has been found that some amount of FeOOH is attracted by the magnet together with the ferrites or magnetite.

Figure 2:
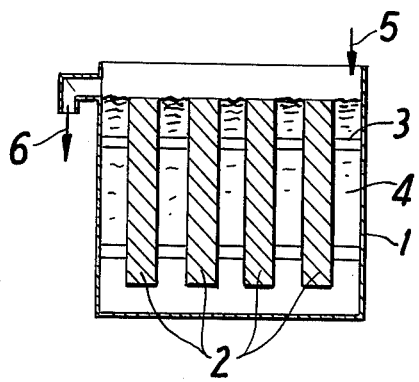
FIG. 2 is a schematic sectional view of an example of apparatus for magnetically separating precipitates according to the invention.
Figure 3:
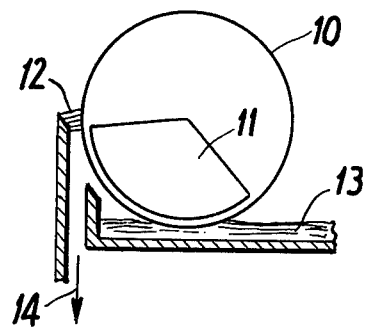
FIG. 3 is a schematic sectional view of another example of apparatus for magnetically separating precipitates.

Referring to FIG. 2, one example of apparatus for separating the precipitates from the water includes a vessel 1 and a plurality of plates 2 made of Ba-ferrite magnet and installed in the vessel by use of separators 3. The waste water 4 already subjected to the oxidation process is introduced into the vessel 1 from one end thereof as indicated by arrow 5, and drained away from the other end as shown by arrow 6. The ferromagnetic precipitate of the waste water 4 is magnetically attracted by the magnet 2. The other precipitate may be deposited at the same time on the bottom of the vessel 1 by sedimentation. In another example shown in FIG. 3, a rotating drum 10 made of a non-ferromagnetic material and provided with a magnet 11 passes through the waste water 13 with ferromagnetic precipitate. The ferromagnetic precipitate magnetically attached to the magnet 11 is taken off by a brush 12 and falls as indicated by arrow 14. Instead, a filtering apparatus with a filter-bed made of a magnet can be employed. Moreover, an electromagnet may be used in place of a permanent magnet.

The method of this invention can extract the heavy metals which are present in waste waters not only in the form of ions but may include complexes such as complex cyanide and ammine complex salt. In this case, the heavy metals are resolved from the complex to ionize by the reaction of this invention and are incorporated into or adsorbed by magnetite or ferrites. Thus, the term "metal ions" includes metal ions as such and metal ion complexes.

It the waste water contains beforehand ferrous ions such as in the case of wastes from Ti industries, addition of ferrous ions to the waste water is unnecessary where the amount of the originally contained ferrous ions is sufficient, or only partial addition is required to make the overall amount of ferrous ions sufficient. Similarly, if the waste water is alkaline or basic, addition of a base is not necessary. In this case, addition of a ferrous salt in an amount to introduce a necessary amount of ferrous ions is only required.

The present invention provides an effective pretreatment for the heavy-metal extracting method. This pretreatment is applicable to acidic waste waters containing Ni, Pb, Cd, Hg, Cu, or other metals having a smaller ionization tendency than Fe, i.e. below iron in the electromotive series. According to this pretreatment, metallic iron such as iron scrap or iron powder is added to the acidic waste water which is then agitated. As a result, free acid, for example free sulfuric acid in the solution, is at first lost by the reaction.

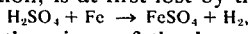

and then ions of the heavy metal, for example, Cu, having a smaller ionization tendency than Fe is reacted with the remaining metallic iron by the reaction of

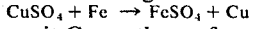

to deposit Cu on the surface of the metallic iron. Thus, the partial surface of iron scrap or iron powder is chemically plated with the heavy metal or metals having a smaller ionization tendency than Fe, and such heavy metal or metals are all or almost all extracted from the waste water. The iron scrap or metallic powder plated with the mentioned heavy metal or metals is removed from the waste water by filtering, by use of a magnet, or by other means. The waste water subjected to such pretreatment may contain only ferrous ions where all the heavy metals originally contained have been extracted by the pretreatment, or contain ferrous ions and the remaining ions of the mentioned heavy metals which have not been extracted by the pretreatment, or further contain heavy metals having a larger ionization tendency than Fe, (that is, above ion in the electromotive series), such as Cr, Mn, and Zn, originally contained in the waste water. In any case, the waste water is thereafter subjected to the treatment of this invention, with ferrous ions further added, if necessary, whereby ferrous ions are extracted from the water as precipitate of $Fe_3O_4$ or $FeOOH$ and other heavy metals are also extracted by incorporation into or adsorption to $Fe_3O_4$ or $FeOOH$.

EXAMPLE 1

To acidic waste water containing Cr, Cd, Pb, Cu, Ni, Bi, and Hg singly or mixedly in the respective amounts shown in Table 1, ferrous sulphate $FeSO_4 \cdot 7H_2O$ was added. Then NaOH was added to the waste water until the neutralization was attained. The suspension was then oxidized by air bubbling at the rate of 50 to 100 liters/hour/liter of solution for 3 hours. Dark green or brown colored precipitates were converted to a black color. The precipitates were removed by a magnet from the suspended water, and residual metal ions contents in the water were examined by Atomic Absorption Spectrometer (Varian Techtron Model AA-5). The results are shown in Table 1 which indicate that all metal ions examined were efficiently extracted from the waste water. This extraction can be thought that metal ions are substituted in the Fe sites in $Fe_3O_4$ crystal lattice.

Table 1

| Kind of Metal | Contents of Metal in Waste Water | |
|---|---|---|
| | Before Treatment | After Treatment |
| Cr | 2,000 pm* | less than 0.1 ppm |
| Cd | 1,800 | 0.1 |
| Pb | 6,800 | 0.1 |
| Cu | 9,500 | 0.5 |
| Ni | 20,300 | 0.5 |
| Bi | 300 | 0.5 |
| Hg | 3,000 | 0.01 |
| Fe | 2.8 to 8.4 wt.% | 0.5 |

*Note: ppm denotes part per million or milligram/liter.

EXAMPLE 2

A waste solution of Pb system flux was prepared which contained $Cr^{6+}$, Fe, Ni, Pb, Cu, and Bi in amounts shown in Table 2, pH being nearly zero. Ferrous sulphate was added to the solution in an amount of 0.3 mol per liter of the solution. Then sodium hydroxide of 1.2 equivalent to the whole acid radical was added, and the solution was agitated and oxidized at 60°C for 3 hours by bubbling air. The precipitates formed were removed by filter, and metal ions remaining in the solution were examined by Atomic Absorption Spectrometer. As will be seen from the results shown in Table 2, heavy metals were almost extracted.

Table 2

| Metal | Before Treatment | After Treatment |
|---|---|---|
| $Cr^{6+}$ | 14 ppm | 0.1 ppm |
| Fe | 3,300 | 0.05 |
| Ni | 9.4 | 0.4 |
| Pb | 2,500 | 0.2 |
| Cu | 6.3 | 0.15 |
| Bi | 600 | 1.2 |

EXAMPLE 3

A waste etching solution containing iron and a pH of almost 1 was prepared which contained Fe, Pb, Bi, Cu, Cr, and Ni in amounts shown in Table 3. Sodium hydroxide of 1.1 equivalent to the acid radical was added to the waste solution which was then oxidized by air-bubbling at 30°C for 4 hours. The precipitates formed comprising iron hydrate and oxide containing heavy metals were then removed by filtering. Metal ions remaining in the solution were examined by Atomic Absorption Spectrometer. The results are shown in Table 3.

Table 3

| Metal | Before Treatment | After Treatment |
|---|---|---|
| Fe | 2,900 ppm | 0.7 ppm |
| Pb | 1.2 | 0.15 |
| Bi | 2.7 | 0.92 |
| Cu | 0.3 | 0.1 |
| Cr | 16.3 | 0.07 |
| Ni | 15.3 | 0.57 |

EXAMPLE 4

To waste of electroless copper plating solution containing complex of copper of 15 gram/liter and having a pH value of 13.6 was added ferrous sulphate in an amount of 0.5 mol per liter of the waste solution. The pH value of the solution was adjusted to almost neutral, that is, 7.2. The solution was agitated and oxidized by air at 70°C for 3 hours. After removal of the precipitates, copper ions and ferrous ions remaining in the solution were 0.33 ppm and 1.5 ppm, respectively.

EXAMPLE 5

To one liter of waste water containing Zn ions of about 0.05 mol/liter and Cd ions of about 0.05 mol/liter and having pH value of 2.2 was added ferrous sulphate of 0.2 mol. After the ferrous sulphate was dissolved into the waste water by agitation, sodium hydroxide of 1 equivalent of the whole acid radical was added to the waste water. The water was agitated and oxidized by air at 50°C for 3 hours to produce precipitates of magnetite. The water was poured into the apparatus of FIG. 2, and about 1 minute thereafter, the precipitates were removed and the water became transparent.

The ions of Zn, Cd, and Fe remaining in the water were measured by Atomic Absorption Spectrometer. The result was 0.05 ppm, 0.05 ppm, and 0.1 ppm for Zn, Cd, and Fe ions, respectively. The amount of suspended solid (the precipitates not removed) was 15 ppm.

EXAMPLE 6

To 1 liter of waste water containing Pb ions of 0.001 mol/liter and Cr ions of 0.002 mol/liter, ferrous sulphate of 0.25 mol was added and dissolved. Then, sodium hydroxide of 1.1 equivalent of the whole acid radical was added to the waste water to form a suspension.

The suspension was oxidized by bubbling air at 35°C for 5 hours. The precipitates consisting of a mixture of α-FeOOH and a small amount of $Fe_3O_4$ were obtained. In the supernatant liquid, a Ba-ferrite magnet was dipped to remove part of suspended solids. The amount of the suspended solids remaining 10 minutes after was 100 ppm, and amounts of Cr, Pb, and Fe ions in the water after the removal of the precipitates were 0.5 ppm, 0.2 ppm, and 0.05 ppm, respectively.

The same suspension as above was similarly oxidized at 60°C for 5 hours. The precipitate of $Fe_3O_4$ was obtained. After removal of the precipitate by use of the Ba-ferrite magnet, the amount of suspended solids was 10 ppm and the amounts of the remaining Pb, Cr, and Fe ions were the same as above.

EXAMPLE 7

To 1 liter of waste water containing Cr of 0.1 mol/liter, Ni of 0.01 mol/liter, Mn of 0.06 mol/liter, and Pb of 0.02 mol/liter, ferrous chloride of 2 mol was added and dissolved. Sodium hydroxide of 0.98 equivalent of the acid radical was then added to the waste water. The waste water whose pH value became about 6 was oxidized by air at 60°C for 10 hours, whereby magnetite was precipitated. The fine particles suspended in the supernatant liquid of the resultant waste water were removed by a Ba-ferrite magnet. Measurements thereafter showed that the remaining amounts of ions were Cr 0.1 ppm, Ni 0.2 ppm, Mn 0.1 ppm, Pb 0.15 ppm, and Fe 0.5 ppm and that the amount of suspended solids was less than 10 ppm.

EXAMPLE 8

To 100 cc of acidic solution containing Cu ions of 3,000 ppm and sulfuric acid and having a pH value of about 2, metallic iron powder of 2.5 wt. % was added and almost all thereof was dissolved. The resultant solution was filtered. To the filtered solution which contained Cu ions of only 6 ppm, sodium hydroxide solution of 1 equivalent to the acid radical was added to make pH value 10. At room temperature, air was bubbled into the solution to obtain precipitates. The amount of Cu ions and Fe ions in the solution after removal of the precipitates was 0.2 ppm and 0.5 ppm, respectively.

EXAMPLE 9

To 100 cc of an acidic solution containing sulfuric acid and Cu ions of 9,000 ppm and having pH value 0.5, iron powder of 3.5 wt. % was added and almost all the iron was dissolved. The deposited Cu and the remaining iron powder were removed by filtering to leave the solution with Cu ions of 5 ppm. To this solution 1N.NaOH was added to make pH larger than 13. The solution was then oxidized at 40°C by air bubbling. The remaining amounts of Cu ions and Fe ions in the solution after removal of the precipitate were 0.08 ppm and 0.1 ppm, respectively.

EXAMPLE 10

To 100 cc of an acidic solution containing hydrochloric acid and ions of Cu (4,000 ppm), Ni (1,000 ppm) and Sn (3,000 ppm) and having pH value of about 1.0, iron powder of 2 wt. % was added and almost all thereof was dissolved. The solution was filtered. The resultant contents of Cu, Ni, and Sn ions were 600 ppm, 300 ppm, and 100 ppm, respectively. Sodium hydroxide was added to the filtered solution to control the pH value to about 9. After the oxidation of the suspension and removal of the precipitates, the remaining amounts of Cu, Ni, Sn, and Fe ions in the solution were 0.2 ppm, 0.1 ppm, less than 10 ppm, and 0.5 ppm, respectively.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A method of extracting heavy metals from acid-containing waste water solution which comprises, providing said solution with ferrous ions and a base selected from the group consisting of hydroxides and carbonates of alkali metals and alkaline earth metals and ammonium hydroxide, the amount of ferrous ions being at least 2 times the amount in mols of the total mols of heavy metals present other than iron, the amount of base added corresponding to 0.9 to 1.2 equivalent of acid radicals present in said solution, thereby providing a suspension of metal hydroxides including ferrous hydroxide, bubbling an oxygen-containing gas into the suspension to oxidize said suspension and form a crystalline precipitate of essentially at least one of the ferric compounds selected from the group consisting of ferrites, magnetite and oxyhydrate of iron containing said heavy metals originally contained in said waste water, and then separating said precipitate from said waste water to obtain clean water.

2. A method of extracting heavy metals from waste water solution, comprising the steps of adding ferrous ions to said waste water in an amount of at least about two times the mol amount of all heavy metal ions present other than iron in said waste water, said solution containing acid radicals, adding a base selected from the group consisting of hydroxides and carbonates of alkali metals and alkaline earth metals and ammonium hydroxide to said waste water in an amount corresponding essentially to 0.9 to 1.2 equivalent of the acid radicals contained in said solution, a suspension of metal hydroxides including ferrous hydroxide being formed following addition of both the ferrous ions and the base, bubbling an oxygen-containing gas into the suspension to stir up and to oxidize the suspension, and form a crystalline precipitate of essentially at least one of the ferric compounds selected from the group consisting of ferrites, magnetite and oxyhydrate of iron containing said heavy metals originally contained in said waste water, and then separating said precipitate from said waste water to obtain clean water.

3. A method of extracting heavy metals from waste water solution containing ferrous ions, comprising the steps of adding ferrous ions to said waste water in such an amount that the mol amount of ferrous ions present in the waste water is at least two times the total mols of heavy metal ions other than iron contained in said waste water, said resulting solution containing acid radicals, adding a base selected from the group consisting of hydroxides and carbonates of alkali metals and alkaline earth metals and ammonium hydroxide to said waste water in an amount corresponding to 0.9 to 1.2 equivalent of the acid radicals present, a suspension of metal hydroxides being obtained containing ferrous hydroxide following the addition of both the ferrous ions and said base, bubbling an oxygen-containing gas into the suspension to stir up and to oxidize the suspension, and form a crystalline precipitate of essentially at least one of the ferric compounds selected from the group consisting of ferrites, magnetite and oxyhydrate of iron and further containing said heavy metals originally contained in said waste water, and then separating said precipitate from said waste water to obtain clean water.

4. A method of extracting heavy metals from waste water solution containing ferrous ions in an amount at least about two times the total mols of said heavy metals present other than iron, said solution containing acid radicals, said method comprising the steps of adding a base selected from the group consisting of hydroxides and carbonates of alkali metals and alkaline earth metals and ammonium hydroxide to said waste water in an amount corresponding to 0.9 to 1.2 equivalent of the acid radicals contained in said waste water to form at least a suspension of ferrous hydroxide, bubbling an oxygen-containing gas into the suspension to stir up and oxidize the suspension, and form a crystalline precipitate of essentially at least one of the ferric compounds selected from the group consisting of ferrites, magnetite and oxyhydrate of iron containing said heavy metals originally contained in said waste water, and then separating the precipitate from said waste water to obtain clean water.

5. The method claimed according to claim 1, wherein said separating step comprises removing said precipitate from the waste water by means of a magnet.

6. The method as claimed in claim 2, wherein said separating step comprises removing said precipitate from the waste water by means of a magnet.

7. A method of extracting heavy metals from acidic waste water, at least one of said metals lying below iron in the electromotive series which comprises the steps of, adding metallic iron to said waste water to chemically deposit said at least one metal below iron in said electromotive series on said metallic iron, separating the iron on which said at least one metal has been deposited from said waste water, adjusting the amount of ferrous ions in said waste water so that it is at least two times the mol amount of the total mols of heavy metal ions remaining in said waste water, raising the pH of said water by adding a base selected from the group consisting of hydroxides and carbonates of alkali metals and alkaline earth metals and ammonium hydroxide in an amount corresponding to 0.9 to 1.2 equivalent of the acid present, and then oxidizing said solution by bubbling an oxygencontaining gas therethrough to form a crystalline precipitate of essentially at least one of the ferric compounds selected from the group consisting of ferrites, magnetite and oxyhydrate of iron containing said heavy metals remaining in said solution and then separating said precipitate from said waste water to obtain clean water.

8. The method as claimed in claim 7, wherein said at least one metal below iron in the electromotive series is selected from the group consisting of Ni, Pb, Cd, Hg and Cu.

9. A method of removing at least one heavy metal selected from the group consisting of Pb, Ti, V, Cr, Mn, Fe, Co, Ni, Cu, Zn, Y, Cd, Sn, Hg, Bi, Al, and Mg from waste water, comprising the steps of providing said waste water with ferrous ions and a base selected from the group consisting of hydroxides and carbonates of alkali metals and alkaline earth metals and ammonium hydroxide, the mol amount of ferrous ions being at least two times the total mols of heavy metals present in the waste water other than ferrous ions, the base being added in an amount corresponding to 0.9 to 1.2 equivalent of acid radicals present in the water, thereby providing a suspension of metal hydroxides including ferrous hydroxide, bubbling an oxygen-containing gas into the suspension to oxidize said suspension and form a crystalline precipitate consisting essentially of at least one ferric compound selected from the group consisting of ferrites, magnetite, and oxyhydrate of iron and containing said at least one metal originally contained in said waste water, and separating the precipitate from said waste water.

10. The method claimed in claim 9, wherein said separating step includes attracting said precipitate by means of a magnet.

11. A method of removing metals from waste water containing at least one metal selected from the group of Pb, Ti, V, Cr, Mn, Co, Ni, Cu, Zn, Y, Cd, Sn, Fe, Hg, Bi, Al and Mg and further containing ferrous ions in a mol amount of at least two times the total mols of said at least one metal present other than iron, said solution containing acid radicals, said method comprising the steps of adding a base selected from the group consisting of hydroxides and carbonates of alkali metals and alkaline earth metals and ammonium hydroxide to said waste water in an amount corresponding to 0.9 to 1.2 equivalent of said acid radicals present to form at least a suspension of ferrous hydroxides, bubbling an oxygen-containing gas into the suspension to oxidize the suspension, and form a crystalline precipitate of essentially at least one of the ferric compounds selected from the group consisting of ferrites, magnetite and oxyhydrate of iron and containing said at least one metal originally contained in said waste water, and separating the precipitate from said waste water.

* * * * *